May 11, 1965  J. J. GARDNER  3,182,820
SHEET STEEL CONVEYOR AND STACKING DEVICE
Filed Nov. 5, 1962  9 Sheets-Sheet 1

INVENTOR.
JOHN J. GARDNER
BY
ATTORNEYS.

INVENTOR.
JOHN J. GARDNER
BY
Watts & Fisher
ATTORNEYS.

May 11, 1965

J. J. GARDNER 3,182,820

SHEET STEEL CONVEYOR AND STACKING DEVICE

Filed Nov. 5, 1962

INVENTOR.
JOHN J. GARDNER
BY *Watts & Fisher*
ATTORNEYS.

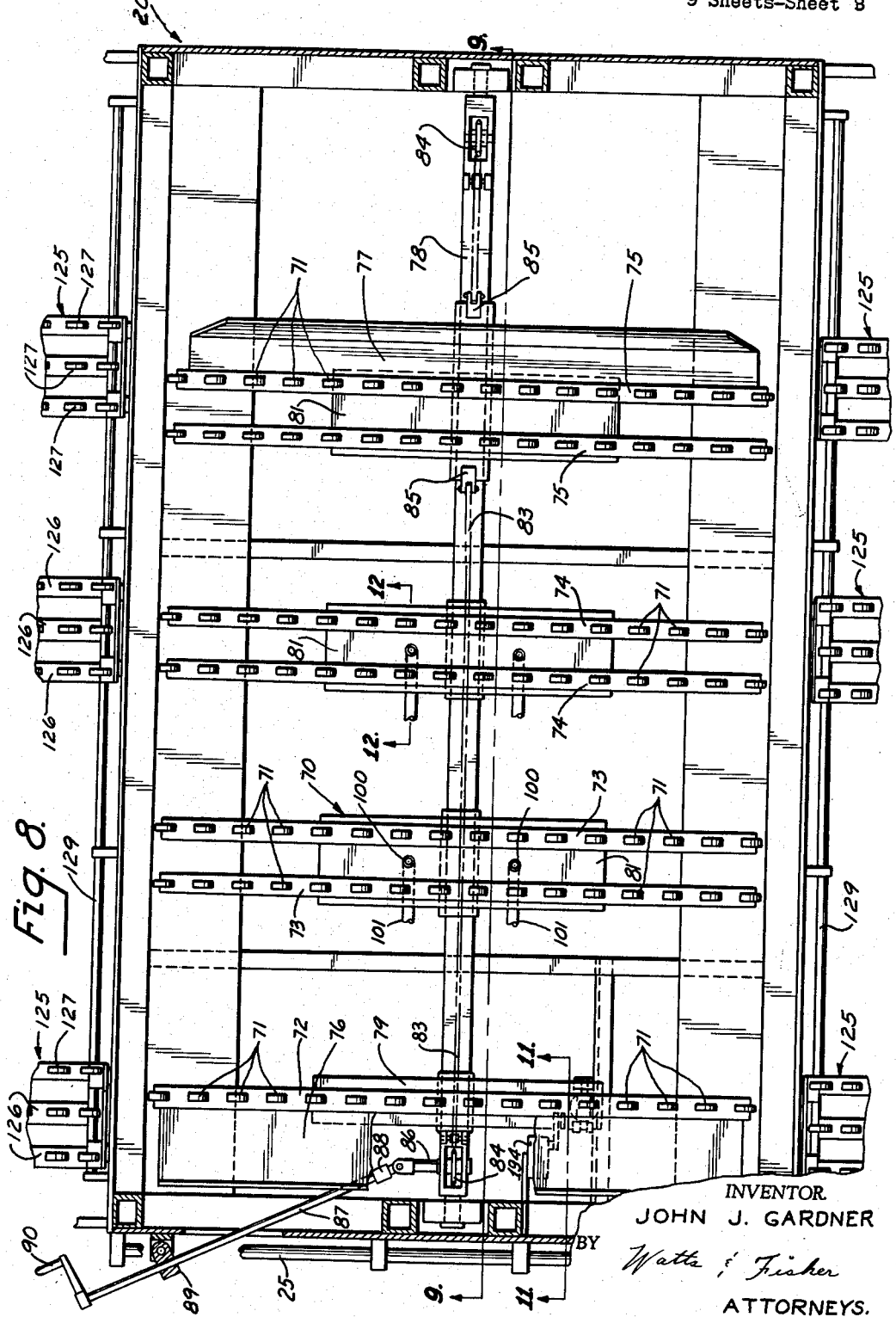

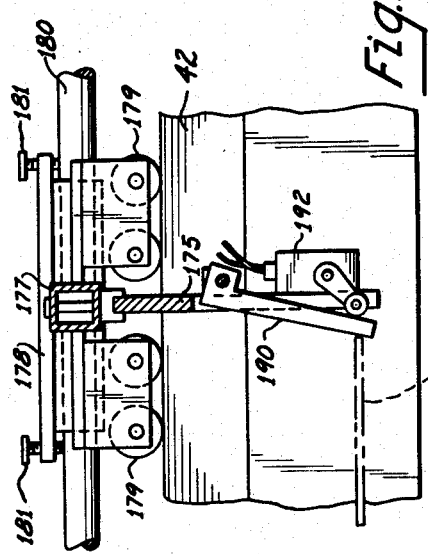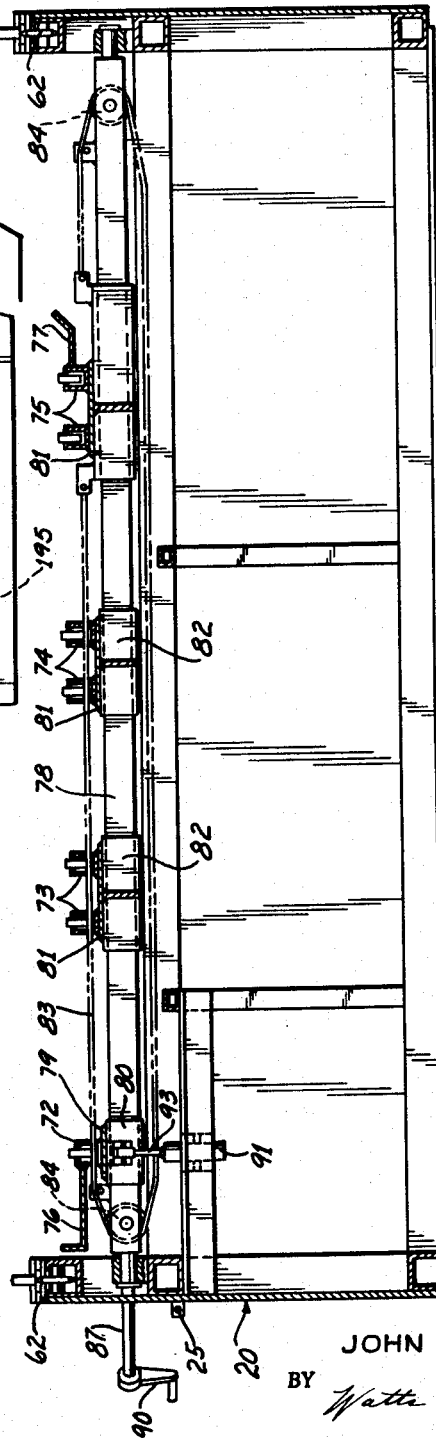

United States Patent Office 3,182,820
Patented May 11, 1965

3,182,820
SHEET STEEL CONVEYOR AND STACKING
DEVICE
John J. Gardner, Mantua, Ohio, assignor to
Morgan Automation, Inc.
Filed Nov. 5, 1962, Ser. No. 235,317
18 Claims. (Cl. 214—6)

The present invention relates generally to work handling apparatus, and more specifically to automatic conveying and stacking apparatus.

The invention is particularly concerned with the handling of stock, including flat plates of various materials, such as metal, plywood, plexiglass and the like, round and flat bar stock, and other shapes, during manufacturing or processing operations. In order to expedite efficient handling of such stock, it is often desirable to place the material in stacks for convenient transportation to and from processing machines or for shipment or storage. For example, it is customary practice in manufacturing plants to stack the material received from various presses, blanking apparatus, flying shears, or conveyors, or the like, so that it can be moved conveniently by lift trucks or other means to another location.

With most conventional stacking methods and apparatus, the stacks must be transferred several times an hour and each time the stacks are transferred the stacking machine must be stopped. This results in considerable lost time, both for the machine and its operator. In addition, when the stacking apparatus is associated with an adjacent machine, such as a press, flying shears, blankers, and the like, it is difficult to handle automatically the stock passing through the machine during the idle time of the stacker.

Further, the limited versatility of most conventional stackers restricts their use to specific work handling applications, and thus they do not satisfy the wide variety of production needs which frequently are encountered. Prior art stackers usually cannot be modified readily to accommodate different feeding heights of presses or the different feeding rates at which the stock must be removed and stacked. Also, many manufacturing operations involve handling of stock of different sizes and shapes, such as flat sheets, stock having an angle or contour cut, bars, and other shapes, such as ovals and the like. Heretofore, the usual stacker has been constructed to efficiently stack only one particular shape, and even then is restricted to a limited range of sizes.

In other operations, there has been a need for a stacker capable of handling stock of different materials, some of which may be lightweight, relatively frangible, or easily scratched. Prior to the present invention, most of the available stacking apparatus was not capable of stacking materials of this type at high rates of speed.

An object of the present invention is to provide a versatile, novel and improved automatic stacking apparatus which can be used effectively in many different types of work handling operations.

A more specific object of the invention is to provide a stacking apparatus which is capable of satisfying modern production needs through its ability to handle a wide range of sizes and shapes, as well as stock of various materials, such as metal, wood, and relatively delicate stock, such as plexiglass or the like.

Another object of the invention is to provide a novel and improved stacking apparatus having the advantages described above which can be operated more efficiently and at higher rates of speed than conventional apparatus.

Still another object of the invention is to provide an automatic stacking apparatus which can be adjusted to the feeding height of any press or associated machine and is capable of operating continuously to convey and stack the work received from the machine.

A further object of the invention is to provide an automatic stacking apparatus as previously described which is compact, relatively maintenance-free, and can be folded into a portable unit.

The improved conveying and stacking apparatus of the invention is adapted to receive material guided into one end of the apparatus and to continuously stack the material selectively at either side of the apparatus, thereby alternately forming stacks which can be transferred away without stopping the machine. The structure for guiding the stock into the apparatus is readily adjustable to the feeding height of an associated machine, while the transfer mechanism which operates to form the stacks can be quickly accommodated to different sizes of stock, shapes and feeding rates.

In the preferred embodiment, the apparatus includes a pair of relatively movable, parallel arms adapted to receive and momentarily support a workpiece. These arms are relatively movable between a support position in which they are in a substantially horizontal plane and a discharge position in which the arms are spaced relatively farther apart. A conveyor is disposed below the arms so that its ends extend laterally therebeyond toward the sides of the apparatus. The conveyor is mounted for pivotal movement about a horizontal axis so that one end can be raised above the other.

In operation, a workpiece is guided onto the arms and is then automatically released by relative movement of the arms onto the conveyor. As will be made more apparent, this releasing movement of the arms is such that the stock will not be damaged even though it is relatively delicate. By selectively tilting the conveyor toward one side of the apparatus or the other, the stock can be slidably discharged and stacked in an associated stacking hopper. When a full load has been stacked on one side of the apparatus, the conveyor can be tilted in the opposite direction so that, while the load is being transferred, the stacking operation may continue.

The support arms and conveyor are adjustable to accommodate stock of different sizes. In addition, the stacking hopper at each side of the apparatus is adjustable in size. According to the preferred embodiment, each hopper is of a novel construction which can be collapsed so that the machine when not in use occupies relatively little floor space. Also, by collapsing the hoppers, the machine can be moved as a portable unit.

Still another preferred feature of the invention resides in the provision of a plurality of air jets on the conveyor. These air jets are directed upwardly and at an angle away from the entrance end of the apparatus and, in operation, form a fluid cushion above the conveyor and the arms which has several advantages. The fluid cushion protects the stock from being scratched or otherwise damaged, and aids in positioning the stock on the arms. In addition, the fluid cushion forms an effective support for the stock regardless of its shape.

Other objects and advantages of the invention will become apparent from the following detailed description and the accompanying drawings.

In the drawings:
FIGURE 1 is a diagrammatic top plan view of the stacking apparatus of the invention;
FIGURE 2 is a diagrammatic end view of the apparatus illustrated in FIG. 1;
FIGURE 3 is an enlarged, partial top plan view;
FIGURE 4 is an enlarged end view similar to FIG. 2;
FIGURE 5 is a side elevational view of the apparatus;
FIGURE 6 is an enlarged, fragmentary end view;
FIGURE 7 is a vertical cross sectional view taken on the line 7—7 of FIG. 2;

3

FIGURE 8 is an enlarged cross-sectional view taken on the line 8—8 of FIG. 2;

FIGURE 9 is a vertical cross-sectional view taken substantially on the line 9—9 of FIG. 8;

FIGURE 10 is a fragmentary cross-sectional view taken on the line 10—10 of FIG. 5;

FIGURE 11 is an enlarged cross-sectional view taken on the line 11—11 of FIG. 8;

FIGURE 12 is an enlarged, fragmentary, cross-sectional view taken on the line 12—12 of FIG. 8; and, FIGURE 13 is an enlarged, fragmentary, cross-sectional view taken on the line 13—13 of FIG. 4.

Figure 1:
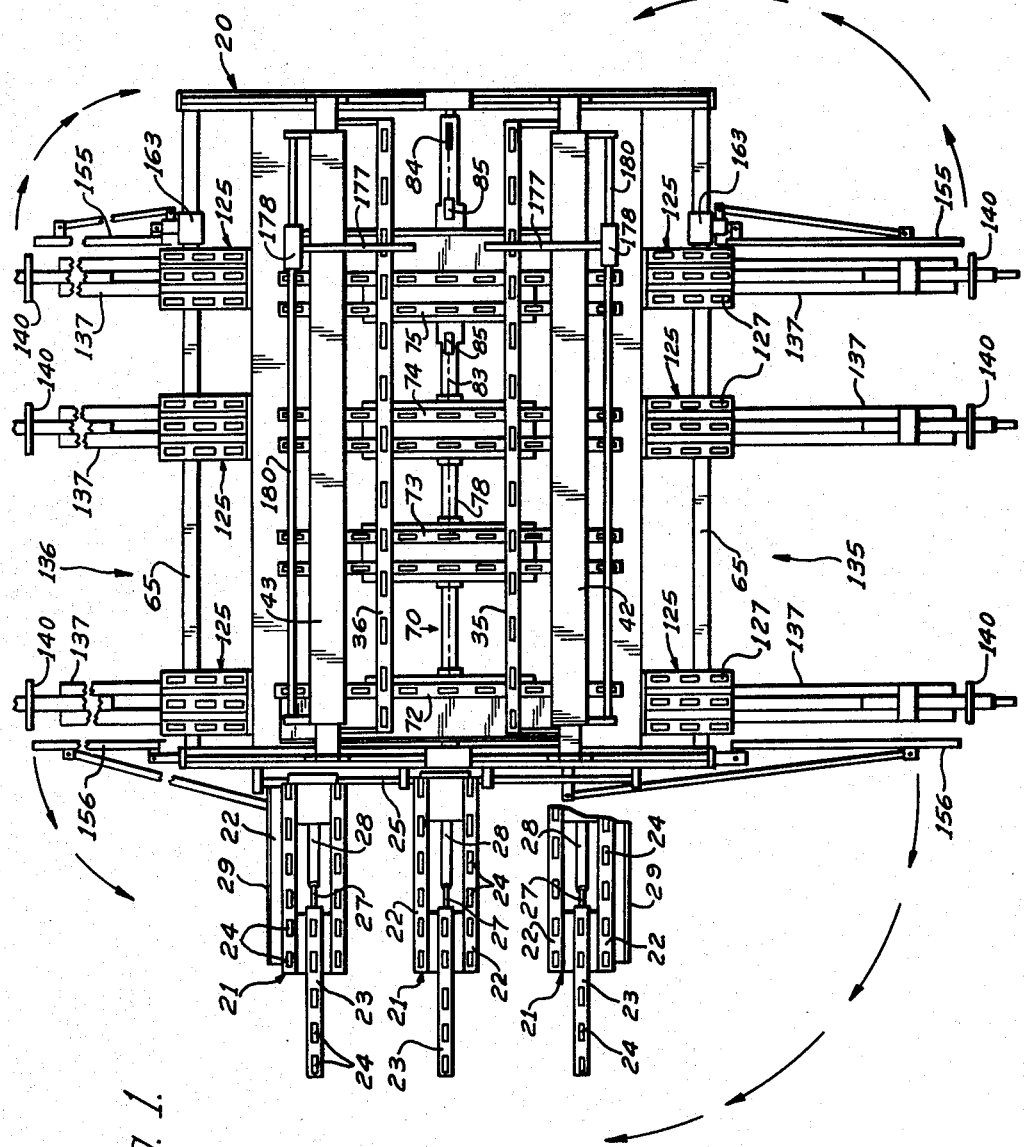
Figure 2:
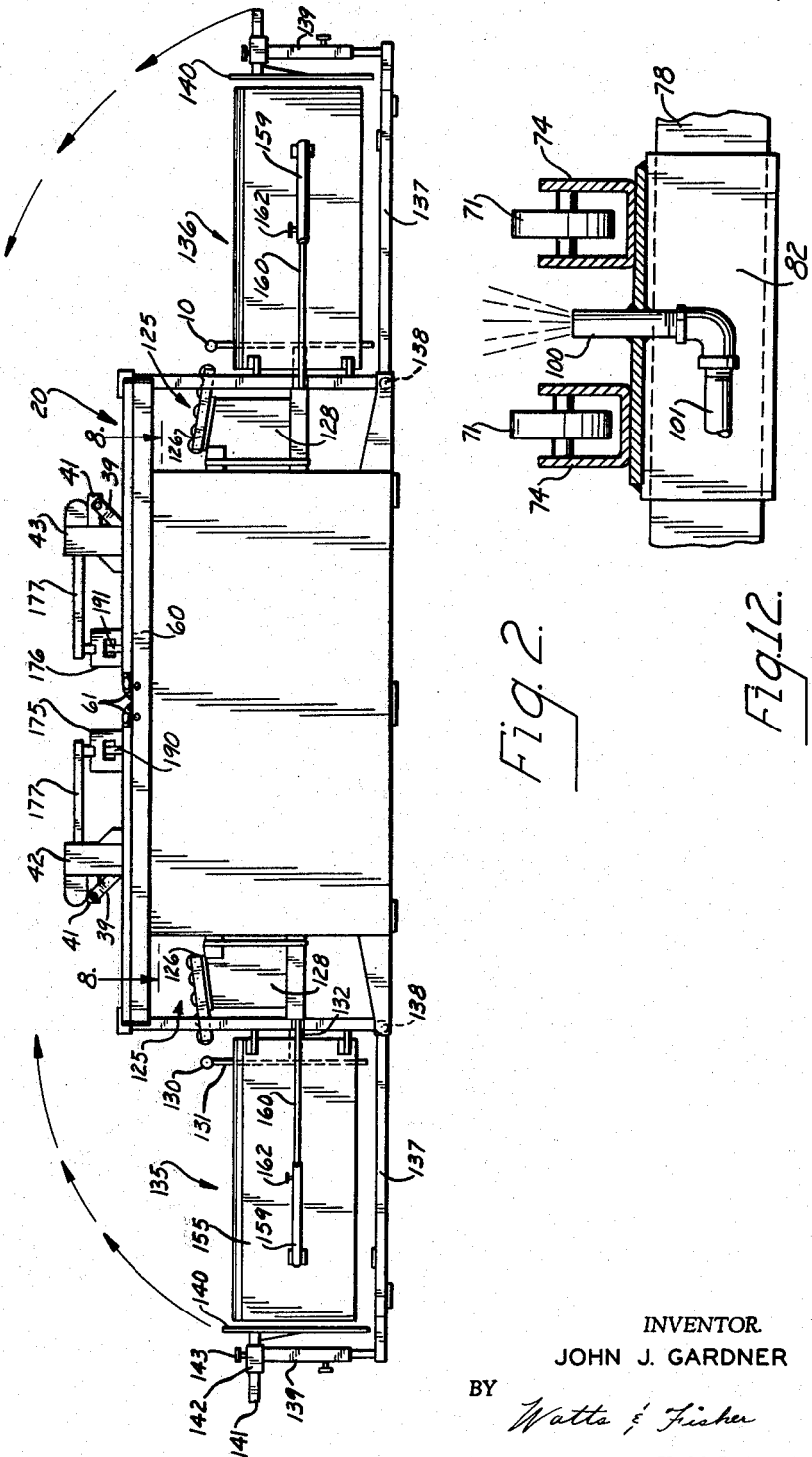
Figure 3:
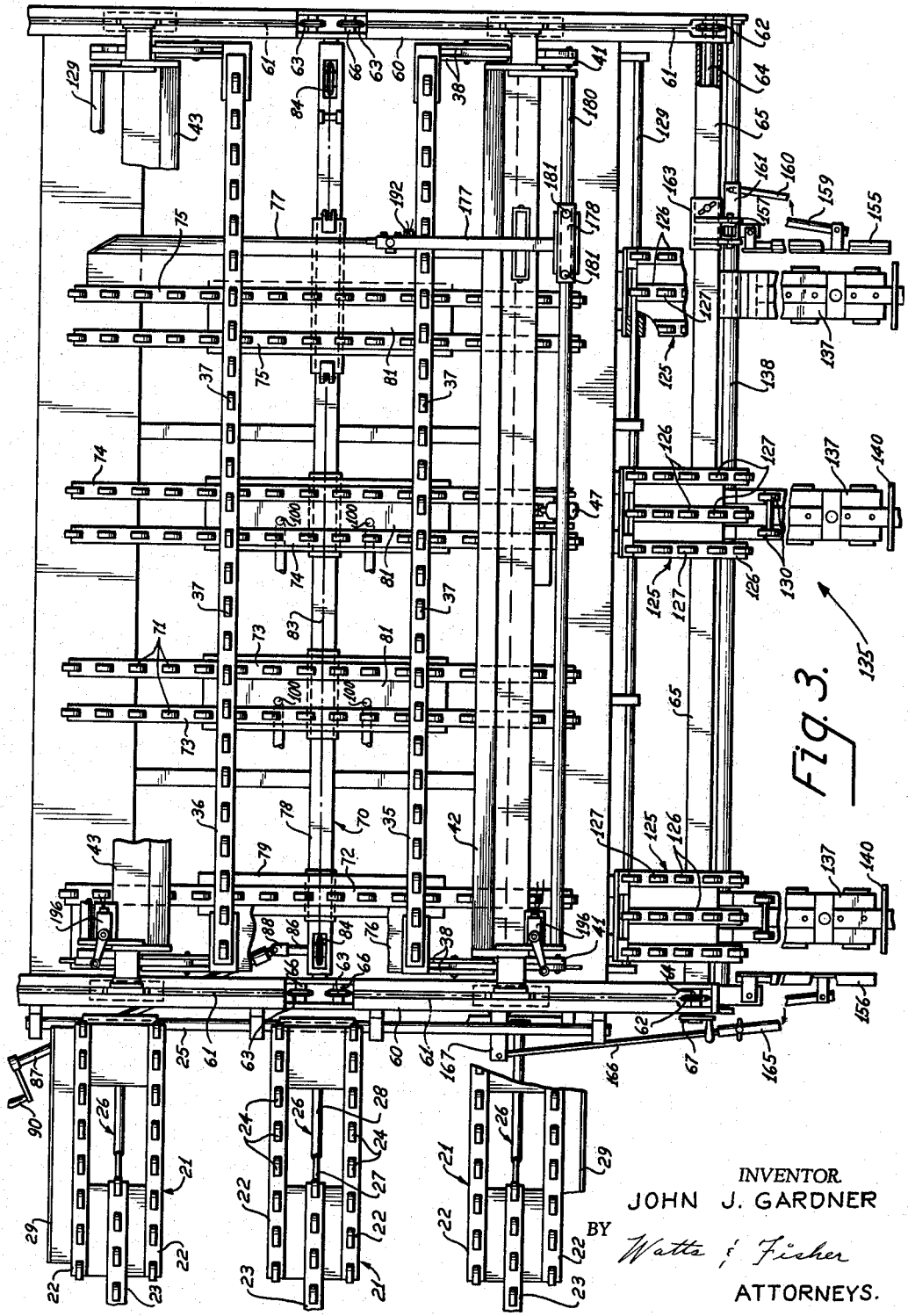
Figure 5:
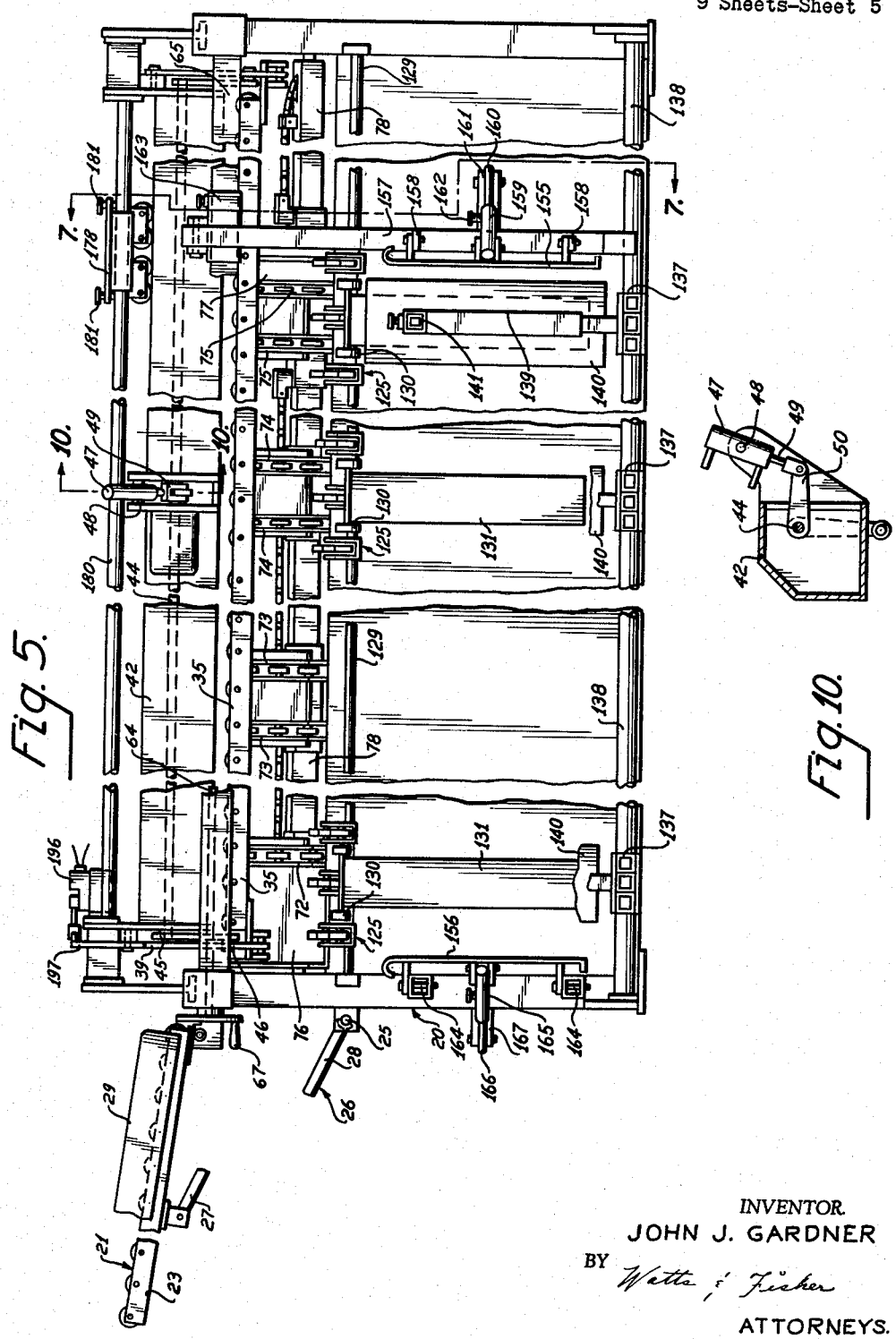
Figure 6:
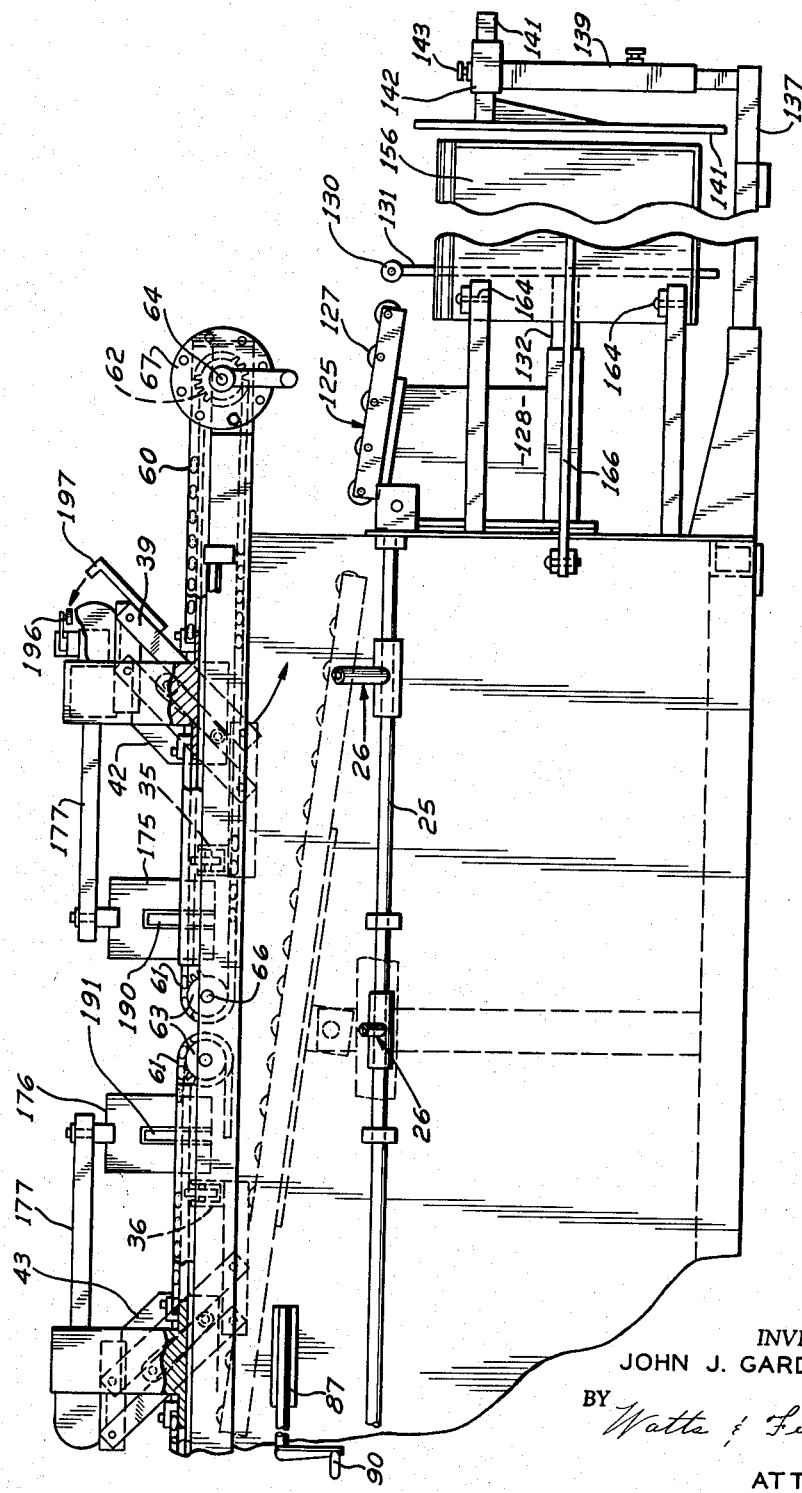

Referring now to the drawings which illustrate the preferred embodiment of the invention, and more particularly to FIGS. 1, 3 and 5, reference numeral 20 generally designates a rectangular frame that is adapted to be positioned adjacent an associated work handling mechanism, such as the end of a conveyor or the transfer means of a press or the like. A plurality of guides 21 extend from one end of the frame for receiving the stock to be stacked.

Preferably, each guide 21 consists of rails 22 and 23 which support freely rotatable rollers 24. Corresponding ends of the rails 22 are slidably and pivotally connected to a horizontal rod 25 which forms part of the frame 20. As most clearly shown in FIG. 5, an extensible arm 26 consisting of telescopically mating members 27 and 28 is pivotally connected to the undersurface of each guide 21 and to the frame. If desired, stock guide plates 29 may be connected to the outermost guide rails 22.

By extending or shortening the support arms 26 to raise and lower the free ends of the guides 21, the guides can be adjusted to the feeding height of the associated mechanism. Also, the guides can be adjusted to suit any width of stock by sliding the guides along the rod 25. Any adjustable means (not shown) may be provided for securing the guides to the rod in their adjusted positions.

A pair of parallel, longitudinally extending support arms 35 and 36 are connected to the frame 20 in position to momentarily support the stock received from the guides 21. The arms 35 and 36 may be provided with spaced, freely rotatable rollers 37 so that the stock guided into the apparatus will move along the arms toward their opposite ends.

The structure for supporting and actuating each of the arms 35 and 36 is identical and therefore only the structure associated with the arm 35 will be described in detail. Referring particularly to FIGS. 3–7, the structure is shown to include a pair of laterally extending plates 38 which are fixed to each end of the arm 35. Each pair of plates 38 carries a pair of spaced, parallel pivot links 39 and 40 which are pivotally connected to the plate and to a vertically spaced member 41. The members 41 associated with the arm 35 are secured to the ends of a carriage beam 42 which extends longitudinally of the frame 20, while the members 41 associated with the arm 36 are connected to a carriage beam 43 corresponding to the beam 42. As most clearly shown in FIGS. 4, 6 and 7, this construction is such that either of the arms 35 or 36 can be swung independently from a support position in which the arms are substantially in a common horizontal plane to a discharge position in which the arms are maintained in a horizontal condition but spaced relatively farther apart and one arm is below the other.

Swinging movement of the arm 35 is obtained by a bar 44 (FIG. 5) which rotatably extends through the beam 42. A link 45 is fixed to each end of the bar 44 and is provided with an extending finger 46 which is engaged between the adjacent pivot links 39 and 40. A double-acting fluid actuator 47 is connected by a pivot member 48 to the beam 42. The piston rod 49 of the fluid actuator is pivotally connected to the free end of a crank arm 50 which is fixed on the bar 44 between its ends (FIG. 10) so that actuation of the fluid actuator 47 will produce rotative movement of the bar 44.

4

Figure 4:
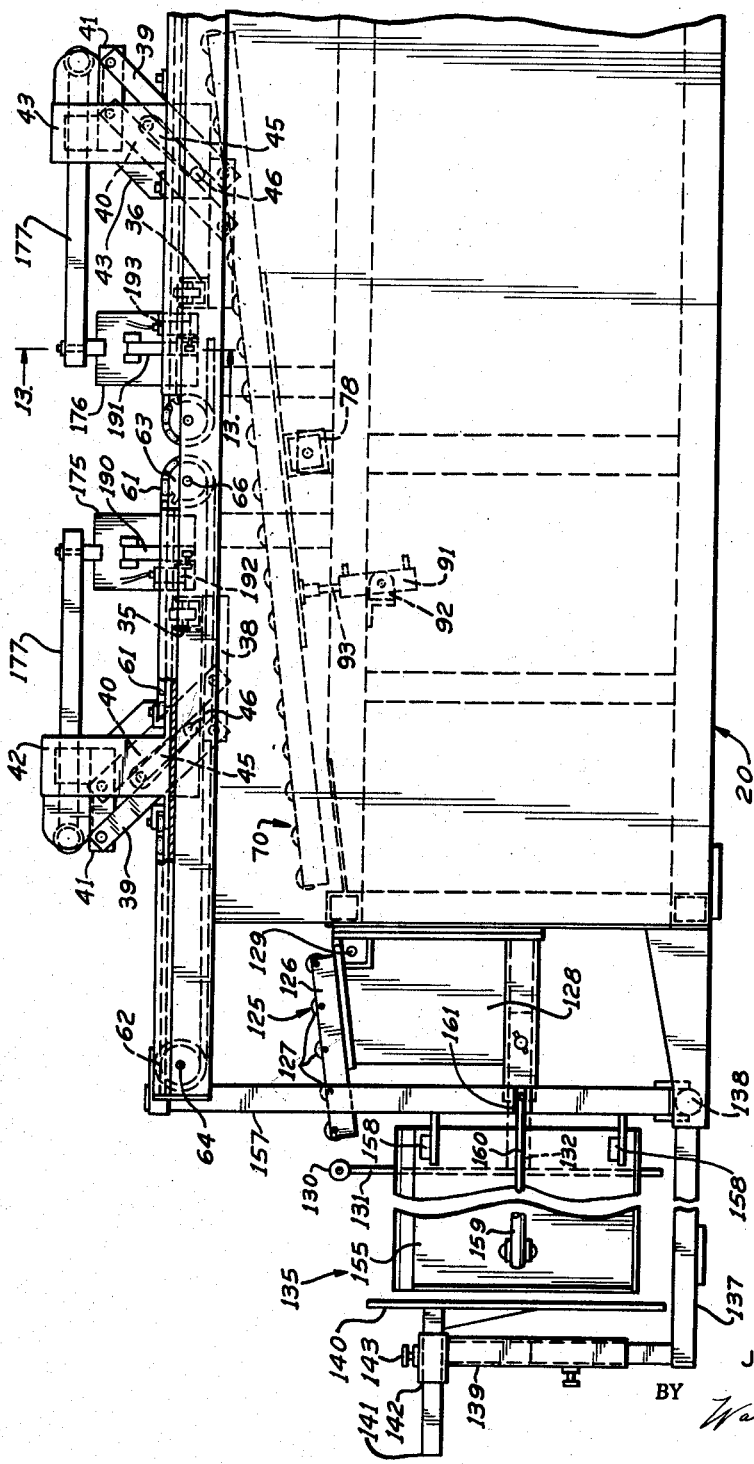
Figure 7:
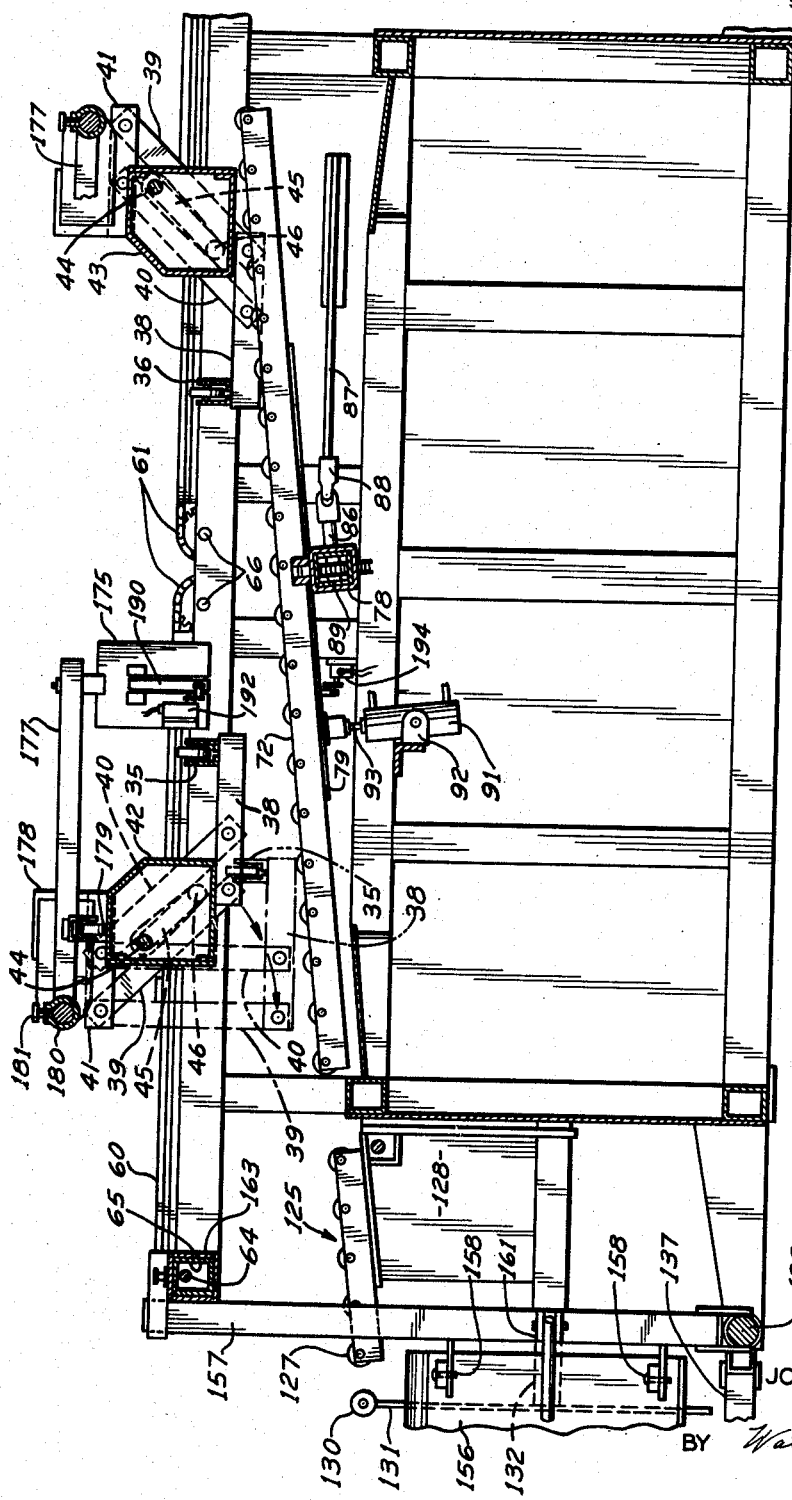

When the bar 44 is rotated clockwise, as viewed in FIG. 4, the fingers 46 extending from the links 45 will engage the pivot links 39 and thus rotate the arm 35 from the solid line position to the broken line position illustrated in FIG. 7. The arm 36 may be independently rotated in a similar manner by a fluid actuator (not shown) mounted on the beam 43 and operatively connected to the rotatable bar 44 extending through the beam.

The ends of the beams 42 and 43 are slidably disposed on end portions 60 of the frame 20 (FIGS. 3, 6 and 7) so that the beams can be moved laterally toward and away from each other to vary the distance between the arms 35 and 36. In order to effect movement of the beam 42, a pair of sprockets 62 and 63 are mounted at each end 60 of the frame, and a chain 61 is entrained around each pair of sprockets and is connected to the adjacent end of the beam 42. As shown most clearly in FIG. 3, the sprockets 62 are secured to the ends of a shaft 64 which extends longitudinally of the frame 20 within a side frame member 65. The sprockets 63 are mounted on axles 66 near the center of each frame portion 60. A hand wheel 67 may be connected to one end of the shaft 64 so that the chains 61 at each end of the frame can be simultaneously actuated to slide the beam 42 toward and away from the beam 43. It will be understood that a similar chain drive assembly is provided for independently adjusting the position of the beam 43.

A conveyor 70 is transversely disposed below the arms 35 and 36 and has its ends extending toward the sides of the apparatus. This conveyor is shown most clearly in FIGS. 8 and 9 to include a plurality of rails, each of which preferably carries a plurality of spaced, freely rotatable rollers 71 for rolling the stock toward either end of the conveyor. In the illustrated construction, a single rail 72 is disposed at the entrance end of the apparatus, while sets of rails 73, 74 and 75 are spaced along the length of the frame 20. Preferably, trays 76 and 77 are respectively secured to the rail 72 and the set of rails 75 at the sides of the conveyor to prevent the stock from cocking and/or falling as it is slidably discharged along the conveyor rails. It will be understood that any desired number of rails or sets of rails may be provided.

The conveyor 70 further includes a bar 78 which extends transversely below the conveyor rails and is rotatably journalled in the ends of the frame 20. The rail 72 is fixedly secured to the bar 78 by a sleeve member 80 which is carried by a plate 79 secured to the underside of the rail. The rails of each set 73, 74 and 75 are secured to plates 81 which also carry sleeve members 82. Each of these sleeve members 82 is mounted on the bar 78 for axial sliding movement so that the sets of rails can be adjusted to any desired position along the length of the bar. Suitable means (not shown) may be provided for locking the sets of rails to the bar 78 in their adjusted positions.

In accordance with the preferred construction, the set of rails 75 can be moved to an adjusted position on the bar 78 by a chain 83. This chain is entrained around sprockets 84 at each end of the bar and has its ends connected to the rails 75 by brackets 85. One of the sprockets 84 is provided with an extending axle 86. A rod 87 is connected to the axle 86 by a universal connection 88 and is rotatably mounted in a bracket 89 that is pivotally secured to the frame 20. The rod 87 has a handle 90 so that the rod can be rotated to move the endless chain 83 and thus adjust the rail set 75 toward and away from the fixed rail 72. Preferably, the center sets of rails 73 and 74 are manually slidable on the bar 76, although they may be connected to the chain, if desired.

The construction of the conveyor 70 is such that the rails can be tilted toward either side of the apparatus to slidably discharge stock transferred from the support arms 35 and 36. To this end, a fluid actuator 91 (FIGS. 4 and 7) is pivotally connected to the frame 20 by a bracket 92. The piston rod 93 of the actuator 91 is pivotally connected to the plate 79 so that, when the actuator 91 is operated, the bar 78 will be rotated to tilt the conveyor rails.

As generally discussed above, one preferred feature of the invention resides in the provision of a plurality of air jets on the conveyor 70. Referring particularly to FIGS. 3 and 12, the air jets 100 are illustrated as being connected to the plates 81 between the rails 73 and 74 so that the jets extend upwardly and at an angle away from the entrance guides 21. As many jets as desired may be provided and they may be connected to the rails 72 and 75 as well as to the rails 73 and 74. Each of the jets may be connected to a suitable source of air under pressure (not shown) by conduits 101.

Referring now to FIGS. 1, 3, 4, 5 and 8, it will be seen that a plurality of conveyor extensions 125 are provided along each side of the frame 20. As shown, each conveyor extension includes three rails 126 which preferably are provided with rollers 127 and are integrally secured to a depending plate 128. According to the preferred embodiment, the conveyor extensions are slidably mounted on rods 129 carried by the frame so that the extensions can be adjustably positioned along the length of the frame to accommodate the size of stock being handled.

The preferred construction of the conveyor extensions 125 also includes a pair of rollers 130 which are spaced from the ends of each set of rails 126. These rollers 130 are carried by a post 131 which is connected to the plate 128 by an extensible arm 132. As will be apparent from this construction, the rollers 130 can be adjustably positioned with respect to the rails 126 by the extensible arms 132.

The stacking hoppers for receiving the stock at each side of the apparatus are generally indicated by reference numerals 135 and 136. Each hopper is of identical construction and includes a plurality of spaced, axially extensible feet 137. Corresponding ends of the feet 137 are pivotally and slidably connected to a bar 138 which extends along the bottom side edge of the frame. The opposite ends of the feet 137 are provided with vertically adjustable posts 139, each of which carries a vertical end plate 140. The end plates 140 are connected to the posts 139 by horizontal arms 141 which extend through sleeve members 142 so that the plates can be moved toward and away from the sides of the frame 20 to vary the depth of the hopper. The arms 141 may be secured in their adjusted positions by bolts 143 which are threaded through the sleeve members 142.

The sides of each hopper are formed by hinged side plates 155 and 156. As shown most clearly in FIG. 5, the side plate 155 is connected to a vertical post 157 by hinge elements 158. An arm consisting of telescopically engaged members 159 and 160 is pivotally connected to the plate 155 and to a brace 161 extending from the post 157 so that the side plate can be swung between a position where it is substantially flat against the side of the frame 20 to the illustrated position in which it extends laterally from the frame. The member 159 may be provided with a clamping screw 162 for locking the side plate against movement.

The lower end of the post 157 is slidable on the bar 138 and its upper end is provided with a sleeve 163 which is slidable on the frame member 65. Thus, the side plates 155 can be adjusted along the length of the frame 20 to vary the width of the hoppers.

The opposite side plates 156 are hingedly connected to the side corners of the frame 20 by vertical pivot pins 164. Each side plate 156 also is connected to the frame by an arm formed by telescopically engaged members 165 and 166 (FIG. 3). As shown in FIG. 3, the member 165 is pivotally connected to the plate and the member 166 is pivotally connected to a brace 167 which extends from the end of the frame. With this construction, the side plates 156 can be swung in the directions indicated by the arrows in FIG. 1 so that they are substantially flat against the ends of the frame.

In operation of the apparatus, the hopper side plates 155 and 156 are swung to extend laterally from the frame 20 and the plates 155 are adjusted along the sides of the frame to provide a hopper width substantially corresponding to the width of the stock. Also, the several feet 137 are positioned between the side plates and are axially extended to accommodate a pallet for supporting the stock in the hoppers. The end plates 140 are positioned a distance from the rollers 103 which substantially corresponds to the length of the stock and are vertically adjusted to form a stack of the desired height.

After one of the stacking hoppers has been filled, the pallet and the supported stack can be removed from the hopper by a lift truck or the like. This may be accomplished by swinging the hopper side plates away from the stack, or simply by engaging the pallet between the posts 139.

When the stacking apparatus of the invention is not in use, the feet 137 can be pivoted vertically about the bars 138 so that they lie against the sides of the frame 20 with the plates 140 at the top of the frame. Additionally, the side plates 155 can be swung against the sides of the frame and the plates 156 swung against the ends of the frame. In this collapsed condition of the hoppers, the apparatus occupies relatively little floor space and, if desired, can be transported as a portable unit.

As generally explained above, one important feature of the invention is that the stacking operation can be continuously and automatically performed. To this end, a pair of stop plates 175 and 176 are provided above the arms 35 and 36, respectively, to position the stock on the arms. Each stop plate is carried by an arm 177 which extends from a carriage 178 (FIG. 13). The carriage for each stop plate 175 and 176 is provided with rollers 179 which may roll along the upper surfaces of the beams 42 and 43, respectively. In addition, each carriage is guided on frame rods 180 which extend above the beams. The carriages may be provided with locking screws 181 so that, when the carriages have been properly adjusted along the beams to position the stock on the arms, they can be locked to the rods 180.

The stop plates 175 and 176 have bifurcated lower portions in which are respectively mounted pivot fingers 190 and 191. Limit switches 192 and 193 are connected to the backs of the plates 175 and 176, respectively, in position to be actuated by the fingers 190 and 191 when they are contacted by a piece of stock that has been fed onto the arms 35 and 36 by the guides 21.

The limit switch 192 is in circuit relation with a solenoid operated valve (not shown) which controls the operation of the fluid actuator 47 that is connected to the arm 35. Similarly, the limit switch 193 is in circuit relation with a solenoid operated valve (also not shown) which controls the fluid actuator 47 for the arm 36.

As shown most clearly in FIG. 11, a double-acting limit switch 194 is connected to the frame 20 in position to be contacted by the plate 79 when the conveyor 70 is tilted toward one side of the apparatus. In the position of the conveyor illustrated in FIG. 11, the limit switch 194 is in closed circuit relation with the limit switch 192 and is in open circuit relation with the limit switch 193. Thus, when a piece of stock 195 engages the stop plates 175 and 176, only the fluid actuator 47 for the arm 35 will be operated. As explained above, operation of the fluid actuator will swing the arm 35 away from and below the arm 36 so that the stock is released onto the tilted conveyor 70. In this manner, the stock will be slidably discharged through one side of the apparatus into the hopper 135.

As shown in FIG. 5, another limit switch 196 is connected to the frame 20 in position to be contacted by an extension 197 of the pivot link 39 when the arm 35 has been swung to the discharge position. This limit switch 196 also is in circuit relation with the solenoid valve which controls the fluid actuator of arm 35, and serves to reverse the valve so that the arm will be swung back to its support position.

When the conveyor 70 is tilted in the opposite direction from that illustrated in the drawings so that it extends toward the hopper 136, the limit switch 194 will be contacted by the plate 79. In this position of the switch the circuit to the limit switch 192 will be opened and the circuit to the limit switch 193 closed. Hence, only the arm 36 will be actuated by engagement of the stock with the stop plates. A limit switch (not shown) corresponding to the limit switch 196 is provided for reversing the operation of the fluid actuator for the arm 36.

The operation of the entire apparatus will be largely apparent from the foregoing description. In summary, the guides 21 are adjusted to the feeding height of the associated mechanism, and the guides, the arms 35 and 36, the conveyor 70, the conveyor extensions 125, and the hopper structures 135 and 136 are adjusted to suit the size of stock. The conveyor 70 then is tilted toward one side of the apparatus by the actuator 91. As explained above, the actuator 47 for the arm 35 or 36 that is above the lower end of the conveyor is conditioned for automatic operation by tilting the conveyor.

A piece of stock received into the stacker will roll along the arms 35 and 36 until it contacts the stop plates 175 and 176. Thereupon, the arm conditioned for operation will be swung away from the other arm to discharge the piece of stock onto the tilted conveyor. The piece of stock will then slide from the lower end of the conveyor into the associated hopper. This cycle of operations is repeated until the hopper is full. Then the conveyor is tilted toward the other hopper so that the stacking operation may continue while the load from the previously filled hopper is removed.

Depending upon the particular conditions of the stacking operations the air jets 100 may be operated to form a fluid cushion above the conveyor 70. When the position of the guides 21 is such that the stock enters the stackers substantially in a horizontal plane, the air issuing from the jets will serve to move the stock along the arms 35 and 36 into engagement with the stop plates. In the case of relatively delicate stock, as might be easily scratched, for example, the fluid cushion protects the stock as it moves on the arms and is then transferred onto the conveyor. Also, the fluid cushion aids in preventing undesirable movement of irregularly formed stock, such as previously described.

It will thus be apparent that the invention provides for a highly efficient, automatic stacking apparatus which can be operated continuously to carry out the desired stacking operations. In use, it has been found that the apparatus can increase production up to 15% over conventional procedures and apparatus. In addition, the novel construction of the apparatus is such that it has the versatility required to satisfy many different production needs as to the type and size of stock that can be efficiently handled.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In an apparatus of the type described, the combination comprising a frame, conveyor means connected to said frame, said conveyor means establishing a path of travel and being operable selectively to cause movement of a workpiece from said apparatus in an opposite direction along said path of travel, support means connected to said frame above said conveyor means for temporarily holding a workpiece in a support position, said support means including means for selectively releasing the workpiece in opposite directions from said support position, and means for actuating said support means to release the workpiece in the direction of movement on said conveyor means.

2. The apparatus as claimed in claim 1 wherein said apparatus includes means defining a hopper adjacent each end of said conveyor means, whereby a workpiece can be loaded into either of said hoppers by selectively moving it along said path of travel.

3. The apparatus as claimed in claim 1 wherein said conveyor means includes means for establishing a fluid work-supporting cushion for the workpiece release from said support means.

4. In an apparatus of the type described, the combination comprising a frame, conveyor means connected to said frame, said conveyor means being selectively tiltable in opposite directions to discharge a sheet from said apparatus, support means including a pair of arms for holding the sheet in a support position above said conveyor means, structure connecting each of said arms to said frame so that either of said arms is movable to disengage the sheet and drop it onto said conveyor means, actuating means for selectively moving each of said arms, said actuating means being operable to move the arm above the lower portion of said conveyor means so that the sheet is released from said arms in the direction of the tilted conveyor means, and guide means extending from one end of said frame for initially receiving the sheet and introducing it onto said arms when in said support position.

5. The apparatus as claimed in claim 4 including hopper means connected to said frame at each end of said conveyor means.

6. A conveying and stacking apparatus comprising a frame, a pair of parallel support arms for supporting a workpiece, means connecting each of said arms to said frame for independent swinging movement away from the other arm so that a supported workpiece can be released by swinging either of said arms, means for independently actuating said arms, a plurality of conveyor rails transversely disposed below said arms, means connecting said rails to said frame for pivotal movement about a horizontal axis, and means for actuating said rails in a selected direction, whereby said rails can be tilted at an angle to the horizontal to slidably receive a workpiece released from said arms.

7. The apparatus as claimed in claim 6 including means connected to said frame for positioning a workpiece on said arms, and means for selectively operating said arm actuating means in response to the direction in which said rails are tilted.

8. The apparatus as claimed in claim 7 including means for respectively adjusting said arms and said rails toward and away from each other to accommodate workpieces of different sizes.

9. A conveying and stacking apparatus comprising a frame, a pair of parallel support arms, said arms being normally positioned in a substantially horizontal plane for supporting a workpiece, a rotatable shaft connecting each of said arms to said frame for independent swinging movement, actuation means connected to said frame and to each shaft, said actuation means being operable to selectively rotate one of said shafts and swing the associated arm away from and below the other arm to release a supported workpiece, stop means connected to said frame for positioning a workpiece on said arms, said stop means being adjustably movable in a direction parallel to said arms and including means for actuating said actuation means, a plurality of conveyor rails transversely disposed below said arms, a rotatable bar connecting said rails to said frame, said bar extending parallel to said arms so that said rails can be tilted at an angle to the horizontal to slidably receive a workpiece discharged from said arms, and means connected to said frame for selectively raising and lowering corresponding ends of said rails.

10. The apparatus as claimed in claim 9 including means for adjustably spacing said arms from one another, and means for adjustably spacing said rails on said bar, whereby said apparatus can accommodate workpieces of different sizes.

11. The apparatus as claimed in claim 10 including hopper means connected to opposite sides of said frame below the ends of said rails, each of said hopper means comprising an axially extensible foot, horizontal pivot means connecting one end of said foot to said frame, a vertically extending plate connected to the opposite end of said foot, a pair of spaced side plates extending between said frame and said vertically extending plate, and vertical pivot means connecting each side plate to said frame.

12. The apparatus as claimed in claim 11 including guide means connected to one end of said frame for receiving a workpiece and guiding it onto said arms.

13. The apparatus as claimed in claim 12 including a plurality of upwardly directed air jets connected to said rails below said arms.

14. The apparatus as claimed in claim 13 wherein said air jets are angled upwardly and away from said one end of said frame.

15. A conveying and stacking apparatus adapted to receive a workpiece guided into one end of said apparatus and to discharge the workpiece from either side, thereby alternately forming stacks at each side of said apparatus, said apparatus comprising in combination:
(a) a frame;
(b) support means connected to said frame;
(c) said support means including a pair of parallel, relatively movable arms;
(d) said arms being relatively movable between a support position in which said arms are substantially in a common plane and a discharge position in which said arms are spaced relatively farther apart;
(e) actuation means connected to said frame and to said support means for relatively moving said arms;
(f) conveyor means disposed below said support means and having its ends extending laterally beyond said arms toward the sides of said apparatus;
(g) means connecting said conveyor means to said frame;
(h) said connecting means including means for selectively elevating one end of said conveyor means above the other, whereby a workpiece discharged from said support means onto said conveyor means may be slidably discharged from a side of said apparatus, and,
(i) means extending from said frame for initially receiving a workpiece and introducing it onto said arms.

16. The apparatus as claimed in claim 15 including collapsible hopper means connected to said frame for selectively receiving the slidably discharged workpieces.

17. The apparatus as claimed in claim 16 including a plurality of air jets connected to said conveyor means, said air jets being angled upwardly and away from said one end.

18. The apparatus as claimed in claim 4 including stop means associated with said arms to position the sheet introduced from said guide means, and wherein said actuating means for selectively moving each of said arms includes first limit switch means associated with said stop means and second limit switch means operatively associated with said conveyor means, said first and second limit switch means being in circuit relation so that the selective movement of said arms is responsive to the direction in which said conveyor means is tilted and to movement of the sheet onto said arms.

References Cited by the Examiner
UNITED STATES PATENTS

| 1,565,840 | 12/25 | Wise | 214—6 |
| 2,139,877 | 12/38 | Brandt | 198—79 X |
| 2,168,419 | 8/39 | Paterson. | |
| 2,217,983 | 10/40 | Hopkins. | |
| 2,643,757 | 6/53 | Kovatch | 198—27 |
| 3,052,339 | 9/62 | Carter. | |

HUGO O. SCHULZ, *Primary Examiner.*

MORRIS TEMIN, *Examiner.*